US012725103B2

(12) United States Patent
Cho

(10) Patent No.: US 12,725,103 B2
(45) Date of Patent: Sep. 1, 2026

(54) AUTOMATED TASK PLANNING SYSTEM AND METHOD USING HEURISTIC EVALUATION VALUE CALCULATED BASED ON CAUSAL ACTION NETWORK

(71) Applicant: ELECTRONICS AND TELECOMMUNICATIONS RESEARCH INSTITUTE, Daejeon (KR)

(72) Inventor: Joon Myun Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 57 days.

(21) Appl. No.: 18/414,821

(22) Filed: Jan. 17, 2024

(65) Prior Publication Data

US 2024/0311723 A1 Sep. 19, 2024

(30) Foreign Application Priority Data

Mar. 16, 2023 (KR) ........................ 10-2023-0034676

(51) Int. Cl.
*G06Q 10/00* (2026.01)
*G06N 5/01* (2023.01)
*G06Q 10/0631* (2023.01)

(52) U.S. Cl.
CPC ......... *G06Q 10/06316* (2013.01); *G06N 5/01* (2023.01)

(58) Field of Classification Search
None
See application file for complete search history.

(56) References Cited

U.S. PATENT DOCUMENTS 8,935,096 B2 1/2015 Choi et al.
2014/0223562 A1* 8/2014 Liu ........................ G06N 3/006 726/23

(Continued)

FOREIGN PATENT DOCUMENTS

CN 114721370 A 7/2022
JP 2016-207157 A 12/2016

(Continued)

OTHER PUBLICATIONS

Sharma, Omveer, Recent advances in motion and behavior planning techniques for software architecture of autonomousvehicles: Astate-of-the-art survey, 2021, Engineering Applications of Artificial Intelligence, https://www.sciencedirect.com/science/article/pii/S0952197621000580, p. 1-19. (Year: 2021).*

(Continued)

*Primary Examiner* — Joseph M Waesco
(74) *Attorney, Agent, or Firm* — LRK PATENT LAW FIRM

(57) ABSTRACT

Provided are an automated task planning system and method using a heuristic evaluation value calculated on the basis of a causal action network. The automated task planning system is a task planning system for calculating heuristic evaluation values of search tree nodes for an action space on the basis of a causal action network, creating a search tree related to completion or achievement of a task, and generating an action plan of an autonomous thing on the basis of the search tree, and includes a processor configured to create an action space search tree. During the creation of the action space search tree, the processor calculates heuristic evaluation values of front nodes and determines an expansion node. The action space search tree is created by connecting action nodes which are nodes corresponding to actions through edges corresponding to states.

20 Claims, 8 Drawing Sheets

(56) References Cited

U.S. PATENT DOCUMENTS

| | | | | |
|---|---|---|---|---|
| 2016/0299507 | A1* | 10/2016 | Shah | G01C 21/203 |
| 2018/0089563 | A1* | 3/2018 | Redding | G05D 1/0088 |
| 2019/0101919 | A1* | 4/2019 | Kobilarov | B60W 60/0011 |
| 2020/0027006 | A1* | 1/2020 | Gupta | G06N 5/01 |
| 2020/0097015 | A1* | 3/2020 | Keselman | G05D 1/0088 |
| 2020/0387158 | A1* | 12/2020 | Kobilarov | B60W 60/0011 |
| 2020/0401892 | A1* | 12/2020 | Redding | G05D 1/0088 |
| 2021/0168827 | A1 | 6/2021 | Shin | |
| 2022/0261644 | A1 | 8/2022 | Cho | |
| 2022/0374712 | A1* | 11/2022 | Redding | G05D 1/0088 |
| 2024/0092398 | A1* | 3/2024 | Caldwell | B60W 10/04 |

FOREIGN PATENT DOCUMENTS

| | | |
|---|---|---|
| KR | 10-2021-0059190 A | 5/2021 |
| KR | 10-2022-0116745 A | 8/2022 |

OTHER PUBLICATIONS

Nir Lipovetzky et al., “Inference and Decomposition in Planning Using Causal Consistent Chains”, Conference: Proceedings of the 19th International Conference on Automated Planning and Scheduling, ICAPS 2009, Thessaloniki, Greece, Sep. 19-23, 2009.

Office Action of the KR Patent Application No. 10-2023-0034676 dated Apr. 9, 2026.

* cited by examiner

FIG.4

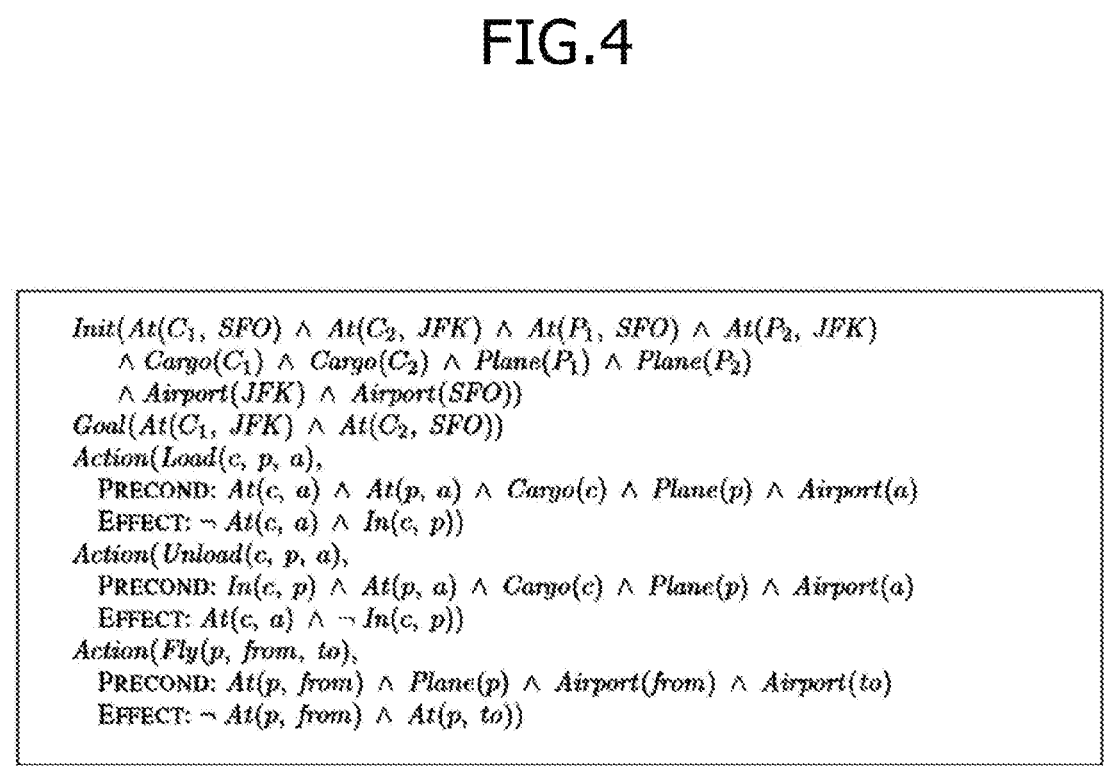

$Init(At(C_1, SFO) \wedge At(C_2, JFK) \wedge At(P_1, SFO) \wedge At(P_2, JFK)$
$\wedge\ Cargo(C_1) \wedge Cargo(C_2) \wedge Plane(P_1) \wedge Plane(P_2)$
$\wedge\ Airport(JFK) \wedge Airport(SFO))$
$Goal(At(C_1, JFK) \wedge At(C_2, SFO))$
$Action(Load(c, p, a),$
PRECOND: $At(c, a) \wedge At(p, a) \wedge Cargo(c) \wedge Plane(p) \wedge Airport(a)$
EFFECT: $\neg At(c, a) \wedge In(c, p))$
$Action(Unload(c, p, a),$
PRECOND: $In(c, p) \wedge At(p, a) \wedge Cargo(c) \wedge Plane(p) \wedge Airport(a)$
EFFECT: $At(c, a) \wedge \neg In(c, p))$
$Action(Fly(p, from, to),$
PRECOND: $At(p, from) \wedge Plane(p) \wedge Airport(from) \wedge Airport(to)$
EFFECT: $\neg At(p, from) \wedge At(p, to))$

AUTOMATED TASK PLANNING SYSTEM AND METHOD USING HEURISTIC EVALUATION VALUE CALCULATED BASED ON CAUSAL ACTION NETWORK

CROSS-REFERENCE TO RELATED APPLICATION

This application claims priority to and the benefit of Korean Patent Application No. 10-2023-0034676, filed on Mar. 16, 2023, the disclosure of which is incorporated herein by reference in its entirety.

BACKGROUND

1. Field of the Invention

The present invention relates to an automated task planning system and method using a heuristic evaluation value calculated on the basis of a causal action network, and more particularly, to an automated task planning system and method using a heuristic evaluation value calculated on the basis of a causal action network that rapidly and efficiently search a search space by calculating heuristic evaluation values of search tree nodes on the basis of a causal action network and thereby show improved performance or speed.

2. Description of Related Art

In general, autonomous things, such as intelligent robots and self-driving cars, are devices, apparatus, or systems which perform given tasks on their own without human intervention in accordance with their current situations.

Among various methods of implementing autonomous things, there is a method of automatically generating an action plan (i.e., a plan including a series of actions for completing a task) and performing a given task on the basis of the generated task plan.

The action plan may be a sequence of actions that are to be performed to achieve (i.e., succeed in) the given task.

Here, the actions are an autonomous thing's unit operations of changing a state of its surroundings.

A task achievement (success) is that the autonomous thing performs the series of actions to change a current state of the surroundings to a target state regulated by the task (i.e., a state of the surroundings when the task is completed).

The method of performing a task on the basis of such an action plan symbolically represents information related to surroundings, tasks, and actions and uses symbol logic calculus in generating a task plan. Such a task performing method may also be referred to as a symbolic automated planning technology.

According to the related art, such a path is generated by creating a search tree for a state space. Creating a state space search tree is a process of sequentially expanding related state nodes from a node representing a current state to a node corresponding to a target state.

Therefore, the performance of a task planning system depends on how rapidly a search tree including a target node is built (expanded), and rapid creation of a search tree depends on how well expansion target nodes are selected.

In other words, when node expansion is done by selecting nodes connected to a target node earlier than other nodes, a search tree including the target node can be rapidly completed. On the other hand, when expansion is done by selecting unrelated nodes which are not connected to a target node earlier, a finally completed search tree increases in size, and thus significant time is required.

The related art of the present invention is disclosed in Korean Patent Application Publication No. 10-2022-0116745 (Aug. 23, 2022).

SUMMARY OF THE INVENTION

The present invention is directed to providing an automated task planning system and method using heuristic evaluation values calculated on the basis of a causal action network that allow automatic generation of an action plan by calculating heuristic evaluation values of search tree nodes for an action space on the basis of a causal action network.

According to an aspect of the present invention, there is provided an automated task planning system using a heuristic evaluation value calculated on the basis of a causal action network, which is a task planning system for calculating heuristic evaluation values of search tree nodes for an action space on the basis of a causal action network, creating a search tree related to completion or achievement of a task, and generating an action plan of an autonomous thing on the basis of the search tree, the automated task planning system including a processor configured to create an action space search tree. During the creation of the action space search tree, the processor calculates heuristic evaluation values of front nodes and determines an expansion node, and the action space search tree is created by connecting action nodes which are nodes corresponding to actions through edges corresponding to states.

To create the action space search tree, the processor may estimate distances from the front nodes to a target node using a heuristic search and select a node with a short distance as an expansion node for a next operation. Here, the processor may select an edge that is highly likely to be connected to a node with a small heuristic evaluation value from among edges connected to expandable sub-nodes rather than searching all edges connected to all the front nodes.

To create the action space search tree, the processor may make a root node an action node that leads to an initial state and make the target node an action node that leads to a target state.

The automated task planning system may further include a knowledge base system to be used in creating a search tree related to a task or generating an action plan on the basis of the search tree.

The knowledge base system may be a system for processing precondition and postcondition data stored in a knowledge base, and the knowledge base may be a device in which action knowledge including a precondition representing knowledge for determining whether an action is executable in a specific situation and a postcondition representing how the situation changes after the action is executed is stored.

The processor may create the action space search tree on the basis of a plurality of task states and a plurality of task actions for performing a task. Here, the task states may be observable positions or forms of an object related to the task during the task, and the task actions may be operations performed by subjects of the task to perform the task.

The automated task planning system may create the action space search tree in an action space by repeating operations of: searching the action space for actions which are executable at a current point in time, updating a current situation to reflect effects of performing any selected one of found executable actions, and determining whether the updated current situation corresponds to a target state.

To expand the action space search tree, the processor may select a front action node with a smallest heuristic evaluation value representing a distance or cost for a target node from among front action nodes. Here, the front action nodes may be actions which are executable at a current point in time and have preconditions satisfied in a situation of the current point in time, and the selection of the front action node may mean reflecting a postcondition of the action in a knowledge base of a current situation.

The causal action network may be a tree structure of which each layer is built by finding causal relationships between all possible detailed actions beginning with a target action node and connecting the detailed actions having the causal relationships.

Each of the causal relationships may be a directional relationship between two actions, "A" action and "B" action. When some preconditions of "A" action correspond to some postconditions of "B" action, there may be a causal relationship from "B" action to "A" action. The preconditions and the postconditions may be conjunctions between units of knowledge, and when some of the preconditions correspond to some of the postconditions, a unit of knowledge constituting the conjunctions of the preconditions may correspond to a unit of knowledge constituting the conjunctions of the postconditions.

When target states are given by a user as conjunctions between a plurality of units of knowledge, the processor may create the action space search tree by repeating operations of: finding a target action node, which is a detailed action node having some postconditions corresponding to some of the target states, among all possible detailed action nodes to build a first-level layer, finding target action nodes, which are detailed action nodes having causal relationships with the target action node of the first-level layer, among a set of all the possible detailed action nodes excluding the action node of the first-level layer to build a second-level layer, and finding target action nodes, which are detailed action nodes having causal relationships with the target action nodes of the second-level layer, among a set of all the possible detailed action nodes excluding the action nodes of the first-level layer and the second-level layer to build a third-level layer until a set of all the possible detailed action nodes is empty or no detailed action node having a causal relationship is found.

The processor may ensure that there are no identical detailed actions in the causal action network by excluding detailed actions that are shown in the causal action network at least once from targets which will belong to a next layer and are searched for a causal relationship.

Each of the heuristic evaluation values may be a level at which one detailed action appears in the causal action network which is a hierarchical network based on causal relationships between detailed actions.

According to another aspect of the present invention, there is provided an automated task planning method using a heuristic evaluation value calculated on the basis of a causal action network, which is a method for a task planning system to create a search tree related to completion or achievement of a task by calculating heuristic evaluation values of nodes and branches on the basis of a causal action network and generate an action plan of an autonomous thing on the basis of the search tree, the automated task planning method including: creating an action space search tree through a processor of the task planning system; and during the creating of the action space search tree, calculating heuristic evaluation values of front nodes and determining an expansion node. The action space search tree is created by connecting action nodes which are nodes corresponding to actions through edges corresponding to states.

The creating of the action space search tree may include estimating, by the processor, distances from the front nodes to a target node using a heuristic search and selecting a node with a short distance as an expansion node for a next operation. Here, the processor may select an edge that is highly likely to be connected to a node with a small heuristic evaluation value from among edges connected to expandable sub-nodes rather than searching all edges connected to all the front nodes.

The creating of the action space search tree may include creating, by the processor, the action space search tree on the basis of a plurality of task states and a plurality of task actions for performing a task. Here, the task states may be observable positions or forms of an object related to the task during the task, and the task actions may be operations performed by subjects of the task to perform the task.

The creating of the action space search tree may include creating, by the task planning system, a search tree in an action space by repeating operations of searching the action space for actions which are executable at a current point in time, updating a current situation to reflect effects of performing any selected one of found executable actions, and determining whether the updated current situation corresponds to a target state.

To expand the action space search tree, the processor may select a front action node with a smallest heuristic evaluation value representing a distance or cost for a target node from among front action nodes. The front action nodes may be actions which are executable at a current point in time and have preconditions satisfied in a situation of the current point in time, and the selection of the front action node may mean reflecting a postcondition of the action in a knowledge base of a current situation.

The creating of the action space search tree may include, when target states are given by a user as conjunctions between a plurality of units of knowledge, creating, by the processor, the action space search tree by repeating operations of finding a target action node, which is a detailed action node having some postconditions corresponding to some of the target states, among all possible detailed action nodes to build a first-level layer, finding target action nodes, which are detailed action nodes having causal relationships with the target action node of the first-level layer, among a set of all the possible detailed action nodes excluding the action node of the first-level layer to build a second-level layer, and finding target action nodes, which are detailed action nodes having causal relationships with the target action nodes of the second-level layer, among a set of all the possible detailed action nodes excluding the action nodes of the first-level layer and the second-level layer to build a third-level layer until a set of all the possible detailed action nodes is empty or no detailed action node having a causal relationship is found.

According to another aspect of the present invention, there is provided an automated task planning method using a heuristic evaluation value calculated on the basis of a causal action network, which is a method for a task planning system to create a search tree related to completion or achievement of a task by calculating heuristic evaluation values of nodes and branches on the basis of a causal action network and generate an action plan of an autonomous thing on the basis of the search tree, the automated task planning method including: creating an action space search tree through a processor of the task planning system, calculating heuristic evaluation values of front nodes to determine an expansion node, estimating distances from the front nodes to a target node using a heuristic search, and selecting a node with a short distance to the target node as an expansion node for a next operation. Here, an edge that is highly likely to be connected to a node with a small heuristic evaluation value is selected from among edges connected to expandable sub-nodes to update the action space search tree, and a target action node is searched for on the basis of the action space search tree to generate a task plan.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is an example of a knowledge base that represents task knowledge and situational knowledge in a symbol logic specification language;

DETAILED DESCRIPTION OF EXEMPLARY EMBODIMENTS

Figure 1:
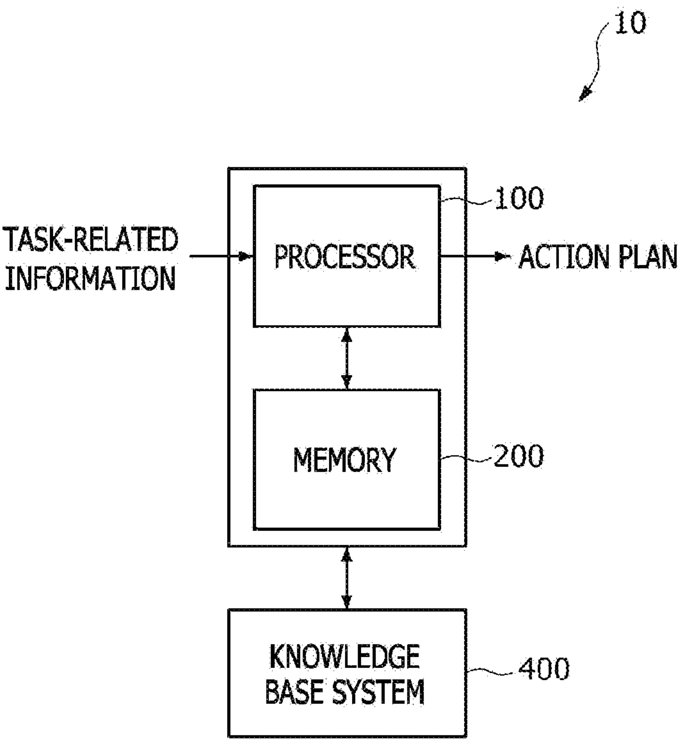
FIG. 1 is a schematic block diagram of an automated task planning system using a heuristic evaluation value calculated on the basis of a causal action network according to an exemplary embodiment of the present invention.

Hereinafter, an automated task planning system and method using a heuristic evaluation value calculated on the basis of a causal action network according to the present invention will be described with reference to the accompanying drawings.

In this process, the thicknesses of lines, the sizes of components, and the like shown in the drawings may be exaggerated for the purpose of clarity and convenience of description. Also, terms to be described below are defined in consideration of functions in the present invention, and the terms may vary depending on the intention of a user or operator or precedents. Therefore, these terms are to be defined on the basis of the overall content of the specification.

FIG. 1 is a schematic block diagram of an automated task planning system using a heuristic evaluation value calculated on the basis of a causal action network according to an exemplary embodiment of the present invention.

Referring to FIG. 1, a task planning system 10 may generate an action plan for performing a task.

Here, the task may be a series of physical actions performed by an autonomous thing. For example, the autonomous thing may be a robot or a self-driving vehicle.

The task planning system 10 may create a search tree related to completion or achievement of the task and generate an action plan on the basis of the search tree.

The task planning system 10 may also be implemented in a personal computer (PC), a data server, or a portable device.

The portable device may be implemented as a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be implemented as a smart watch, a smart band, or a smart ring.

The task planning system 10 includes a processor 100 and a memory 200 and further includes a knowledge base system 400 or is in communication with the knowledge base system 400. Accordingly, the task planning system 10 may use the knowledge base system 400 in creating a task-related search tree or generating an action plan on the basis of a search tree.

Here, a knowledge base (not shown) is a device for storing action-related knowledge including preconditions (i.e., preconditions representing knowledge for determining whether an action is executable in a specific situation), postconditions (i.e., postconditions representing how the situation changes after the action is executed), and the like, and the knowledge base system 400 is a system for processing the preconditions and postconditions stored in the knowledge base.

The processor 100 may process data stored in the memory 200.

The processor 100 may execute computer-readable code (e.g., software) stored in the memory 200 and instructions triggered by the processor 100.

The processor 100 may be a data processing device implemented as hardware having a circuit that is physically structured to execute desired operations. For example, the desired operations may include code or instructions included in a program.

For example, the data processing device implemented as hardware may be a microprocessor, a central processing unit (CPU), a processor core, a multi-core processor, a multiprocessor, an application-specific integrated circuit (ASIC), or a field programmable gate array (PGA).

The processor 100 may create a search tree on the basis of a plurality of task states constituting a task and a plurality of task actions for performing the task.

The task states may be observable positions or forms of an object related to the task during the task. Here, the object related to the task may be a target on which the task will be performed or a subject that will perform the task.

The task actions may be operations that are performed by subjects of the task to perform the task.

The search tree may be a set of figures that may represent the progression of the task by showing the task states as nodes and showing the task actions as edges.

The processor 100 may create a state space search tree by generating nodes corresponding to a plurality of task states and connecting the nodes through edges corresponding to a plurality of task actions. Also, the processor 100 may create an action space search tree. The action space search tree may be created by generating nodes corresponding to actions and connecting the nodes through edges corresponding to states.

A process of creating a state space search tree will be described in further detail below with reference to FIGS. 3A to 3C.

The processor 100 may generate sequence data on the basis of a plurality of task states, a plurality of task actions, and a task.

The memory 200 may store instructions (or a program) that are executable by the processor 100. For example, the instructions may include instructions for performing an operation of the processor 100 and/or an operation of each element of the processor 100.

The memory 200 may be implemented as a volatile memory device or a non-volatile memory device.

The volatile memory device may be implemented as a dynamic random access memory (DRAM), a static RAM (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, or an insulator resistance change memory.

Figure 2:
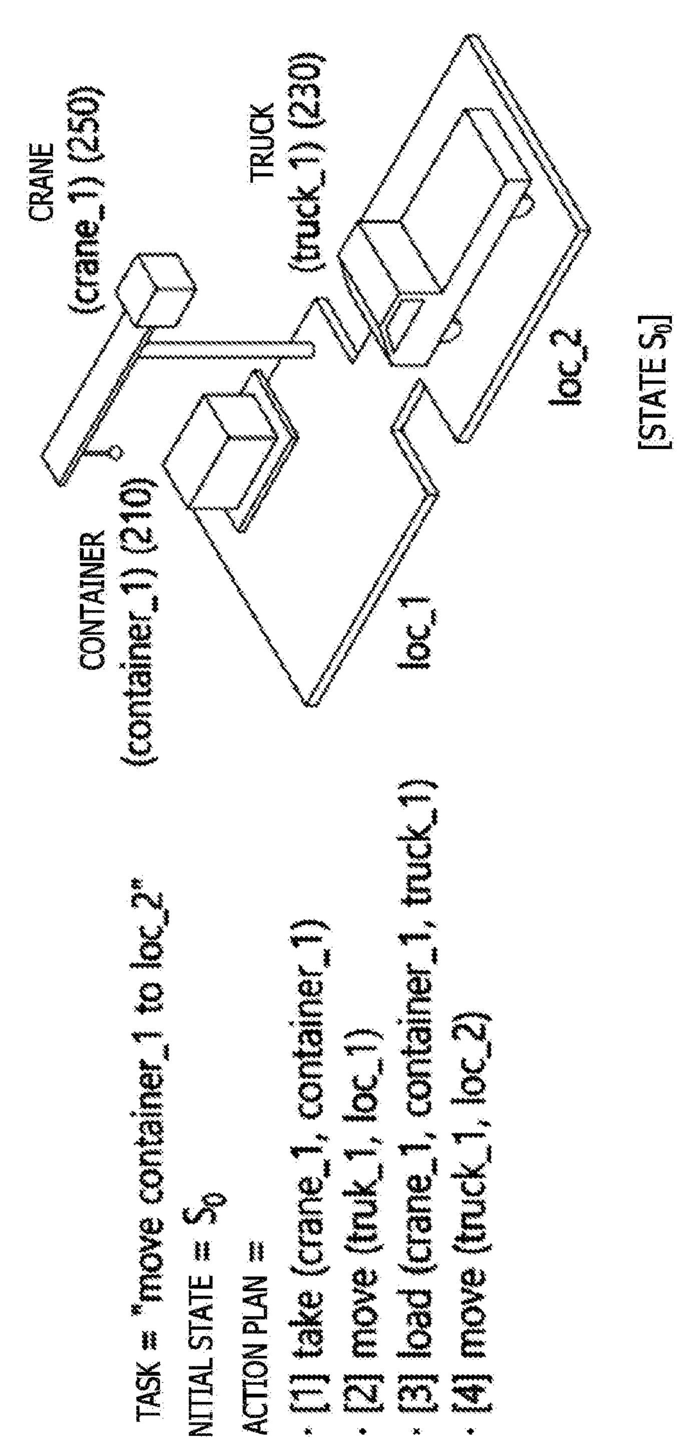
FIG. 2 is a diagram illustrating a task and a task plan.

FIG. 2 is a diagram illustrating a task and a task plan.

Referring to FIG. 2, the task planning system 10 may be implemented in an autonomous thing that performs a task.

The task planning system 10 may include a cognitive system and an action system. Here, the cognitive system may continuously perceive a state (or situation) of surroundings of the task planning system 10, and the action system may deterministically execute a determined (or called) action.

The processor 100 may generate an action plan for performing a task.

The action plan may include task states and task actions for changing the task states. Here, the task actions may be unit operations that change task states (e.g., a surrounding state).

Also, the action plan may be a state transition path that reaches from an initial state to a target state in a state space including all possible task states and transitions between the states.

The example of FIG. 2 may symbolically represent a simple task environment, a current task state (an initial state (e.g., $S_0$)), a given task, and an action plan for the given task.

In the example of FIG. 2, the task may be a task of moving a container 210 (e.g., container_1) to a specific place (e.g., loc_2).

FIG. 2 may show an initial state before the task is started.

The processor 100 may generate an action plan to move the container 210 (e.g., container_1) to a truck 230 (e.g., truck_1) using a crane 250 (e.g., crane_1).

The action plan for this may include the following plurality of task actions.

A first task action may be an action of lifting the container 210 using the crane 250. A second task action may be an action of moving the truck 230 to a first location (e.g., loc_1). A third task action may be an action of loading the container 210 onto the truck 230 using the crane 250. A fourth task action may be an action of moving the truck 230 to a second location (e.g., loc_2).

Figure 3A:
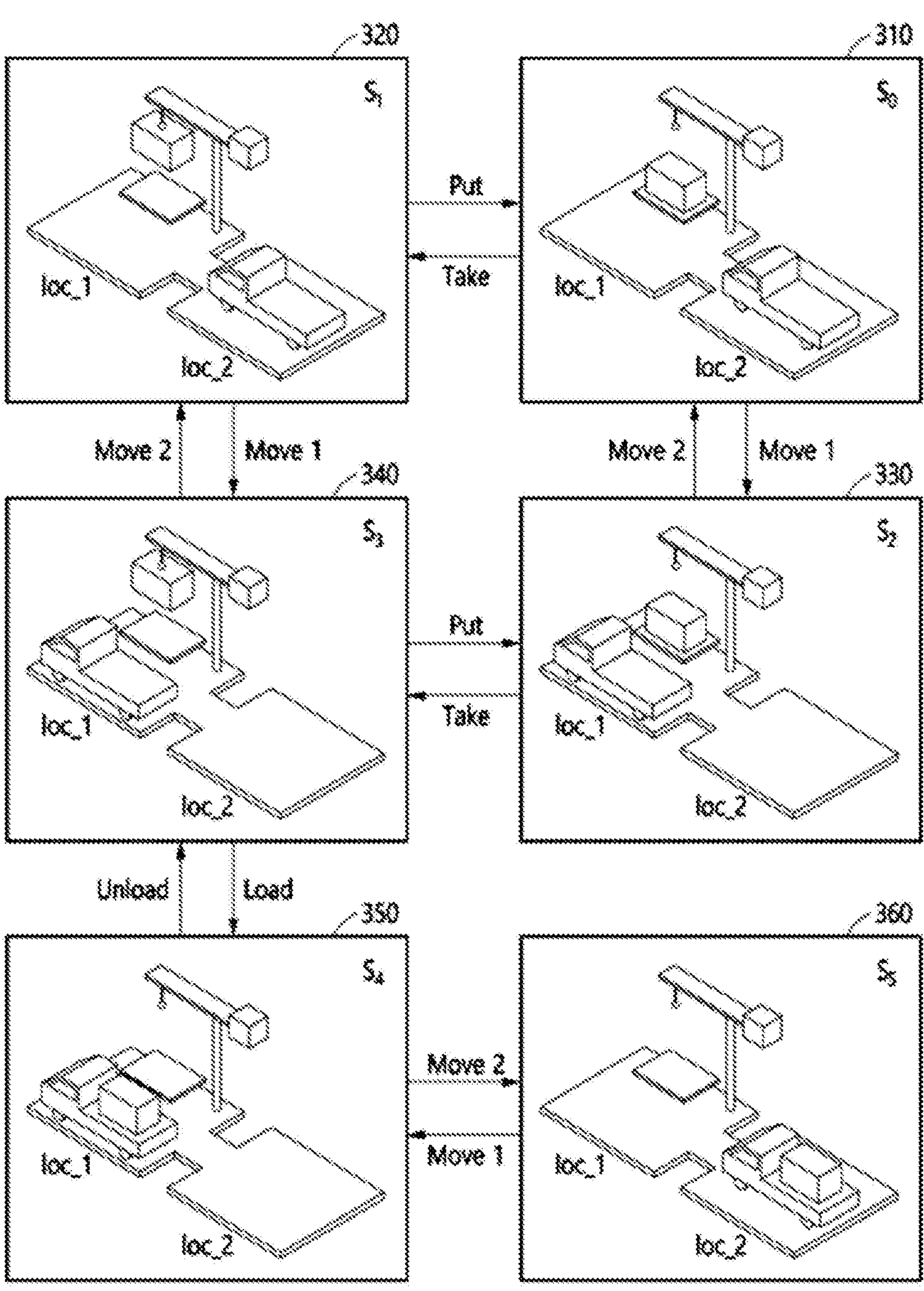
FIG. 3A is a set of diagrams illustrating task states that may occur in the example of FIG. 2.
Figure 3B:
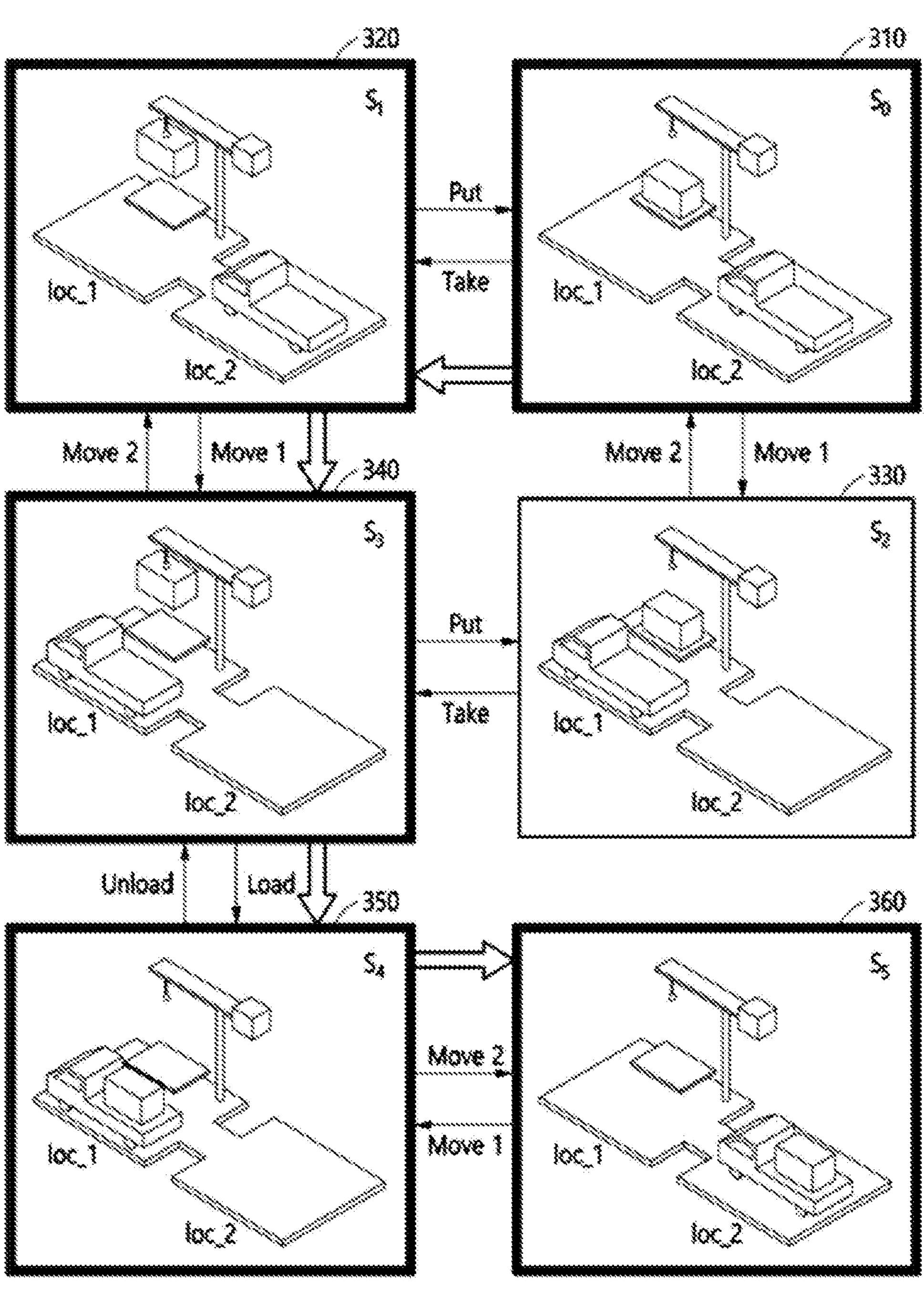
FIG. 3B is a set of diagrams illustrating an operation of generating a state space transition path that reaches from an initial state to a target state according to a task in the example of FIG. 2.
Figure 3C:
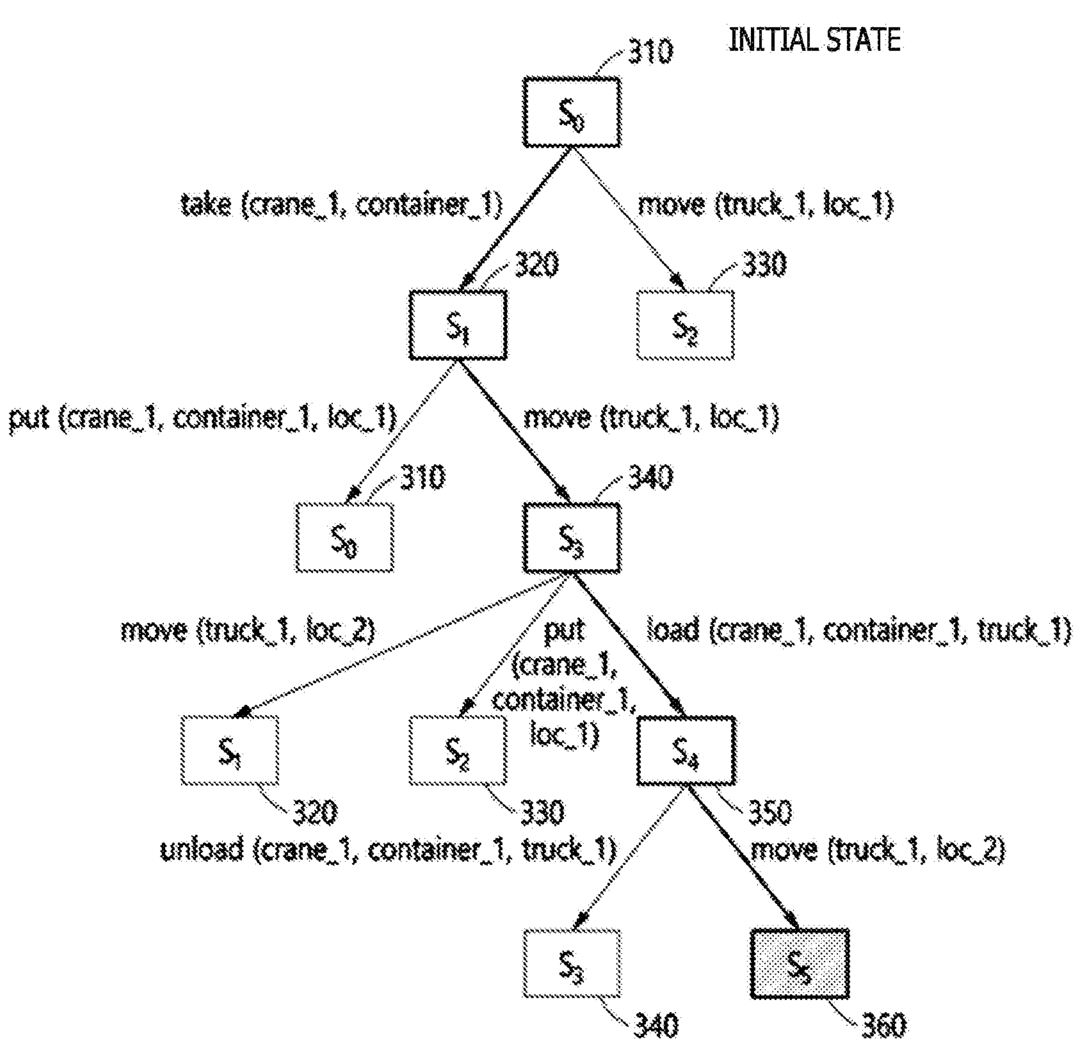
FIG. 3C is a diagram illustrating a search tree according to a task in the example of FIG. 2.

FIG. 3A is a set of diagrams illustrating task states according to the task of FIG. 2, FIG. 3B is a set of diagrams illustrating a state transition path in a state space according to the task of FIG. 2, and FIG. 3C is a diagram illustrating a search tree (or a state space search tree) created to generate (or search for) a state transition path in the state space according to the task of FIG. 2.

Referring to FIGS. 3A to 3C, the processor 100 may perform the task on an object which is a target of the task through the series of task actions illustrated in FIG. 2.

An action plan may include a state space transition path (or a state transition path) having a sequence of task states that change according to task actions. The processor 100 may efficiently predict a state space transition path (or a state transition path) using a search tree (or a state space search tree).

FIG. 3A is a set of diagrams illustrating task states that may occur in the example of FIG. 2.

A task state 310 may be an initial state.

A task state 320 may be a state in which the crane is lifting the container and the truck is at the second location (e.g., loc_2).

The task state 310 and the task state 320 may each be switched to the other through a task action of the crane lifting and putting down the container.

A task state 330 may be a state in which the truck has moved from the second location (e.g., loc_2) to the first location (e.g., loc_1).

The task state 330 and the task state 320 may each be switched to the other through a task action of the truck moving.

The task state 320 may be switched to a task state 340 through a task action of the truck moving. Alternatively, the task state 330 may be switched to the task state 340 through a task action of the crane lifting the container.

The task state 340 may be switched to a task state 350 through a task action of the crane loading the container onto the truck.

The task state 350 may be switched to a task state 360 through a task action of the truck moving.

FIG. 3B is a set of diagrams illustrating an operation of generating a state space transition path that reaches from an initial state to a target state by connecting the task state of FIG. 3A through task actions.

The processor 100 may generate an action plan by searching for an optimal state space transition path using a search tree.

The processor 100 may generate an action plan by determining a target path (or a target state space transition path) from an initial state (e.g., the task state 310) to a target state (e.g., the task state 360).

The processor 100 may create a search tree (or a state space search tree) by sequentially expanding related nodes from a node representing a current task state to a node corresponding to the target state.

For reference, the performance of the task planning system 10 depends on how rapidly a search tree (e.g., an action space search tree or a state space search tree) is built (or expanded), and rapid creation of a search tree depends on how well expansion target nodes are selected.

For example, when expansion to a next node is done by selecting a node connected to the target node earlier than other nodes, a search tree is rapidly completed. On the other hand, when expansion is done by selecting an unrelated node which is not connected to the target node earlier than other nodes, a finally obtained search tree increases in size, and thus significant time is required.

All nodes expanded from a search tree at one point in time, that is, nodes without sub-nodes, during the creation (or expansion) of a search tree are referred to as front nodes, and the front nodes are candidates for an expansion node for a next operation.

Here, a method of estimating the distance (or cost) from each front node to a target node and selecting a node with a short distance as an expansion node for a next operation is referred to as a heuristic search method, and a method of calculating an evaluation value for estimating a distance (or cost) to a target node is referred to as a heuristic estimation method.

Here, it is difficult to find a universal-use heuristic method showing good performance in a variety of domains (i.e., a heuristic method), and a heuristic method showing good performance in some domains generally requires significant time and resources to calculate node evaluation values. Accordingly, a heuristic method that consumes little time and a small number of resources to calculate node evaluation values and is applicable to a variety of domains, that is, a heuristic estimation method, is necessary.

The processor 100 may estimate the distance to the target node using a heuristic or a heuristic search in a process of generating an initial search tree.

The heuristic search may be a method of estimating the distance from a front node to a node corresponding to a target state (e.g., a target node) and selecting a node with a short distance as an expansion node for a next operation, and a process of estimating a path may be referred to as a heuristic.

The processor 100 may estimate an edge that is highly likely to be connected to the target node from among edges connected to a node and thus can search for an optimal path with higher performance than that of the simple heuristic.

The processor 100 does not search all edges available to all the front nodes. Rather, the processor 100 selects an edge that is highly likely to be connected to a node with an excellent evaluation value (e.g., a small evaluation value) from among edges connected to expandable sub-nodes and thus can efficiently perform a path search.

FIG. 4 is an example of a knowledge base that represents task knowledge and situational knowledge in a symbol logic specification language.

Here, task knowledge may be linguistic expressions that describe at least one unit task for performing a mission in text. Also, task knowledge may be knowledge that is required for creating a search tree to generate an action plan or evaluating the distance from a search tree node to a target node to rapidly search a search tree, and may be situational knowledge (or state knowledge) for a robot to perform a corresponding action and effect knowledge (situational knowledge) about surroundings changed after the robot performs the corresponding action.

A symbolic model (e.g., a knowledge base) with which the task planning system 10 describes a target domain represents action knowledge (or task knowledge), initial situation knowledge (or initial state knowledge), and target situation knowledge (or target state knowledge), and the symbolic model (e.g., the knowledge base) represents a search space.

Such action knowledge (or task knowledge) may be expressed as "Action( . . . )" in a symbol specification language in a knowledge base. Also, situational knowledge (or state knowledge) may be a linguistic expression that describes at least one piece of environment information of a corresponding point in time or a corresponding situation in text, the initial situation knowledge (or the initial state knowledge) may be expressed as "Init( . . . )" in a symbol logic specification language in the knowledge base, and the target situation knowledge (or the target state knowledge) may be expressed as "Goal( . . . )" in a symbol logic specification language.

For example, referring to FIG. 4, when "a mission (goal) to move first cargo $C_1$ to an airport SFO and move second cargo $C_2$ to an airport JFK using airplanes" is given to the task planning system 10, action knowledge (or task knowledge) may express a unit task of loading a cargo onto an airplane, a unit task of moving the airplane to another airport, and a unit task of unloading the cargo from the moved airplane in the form of Action(Load(c,p,a)), Action (Fly(c, from, to)), and Action(Unload(c,p,a)), respectively.

As described above, at a point in time when the task of loading cargo onto an airplane is requested after "the mission (goal) to move the first cargo $C_1$ to the airport SFO and move the second cargo $C_2$ to the airport JFK using airplanes" is given to the task planning system 10 as described above, situational knowledge (or state knowledge) may express situational information that the first cargo and a first airplane are located in the airport SFO and the second cargo and a second airplane are located in the airport JFK in the form of Init(At($C_1$, SFO), ($P_1$, SFO), ($C_2$, JFK), ($P_2$, JFK), . . . ).

Here, the action knowledge (or the task knowledge) includes a list of variables representing input factors (i.e., input factor variables or input variables), a precondition representing knowledge for determining whether a corresponding task is executable in a specific situation (or point in time), and a postcondition or effect representing how the situation changes after the corresponding task is executed.

The variables representing input factors (i.e., input factor variables or input variables) are assumed to include type information which represents types of bindable values.

For example, referring to FIG. 4, when "the mission (goal) to move the first cargo $C_1$ to the airport SFO and move the second cargo $C_2$ to the airport JFK using airplanes" is given, type-specific input variables may be the first cargo $C_1$ and the second cargo $C_2$ corresponding to cargo information and the first airport SFO and the second airport JFK corresponding to airport information.

The foregoing action knowledge (or task knowledge) and situational knowledge (or state knowledge) implicitly represent a space to be searched by the task planning system 10 (i.e., a search space). According to a related task planning technology, an action (or task) executable at the current point in time is found in the search space, and effects (or postconditions) of the action (or task) are reflected in situational knowledge (i.e., a knowledge base of the corresponding situation). In this process, a search tree is created (or expanded) (see FIG. 5).

Figure 5:
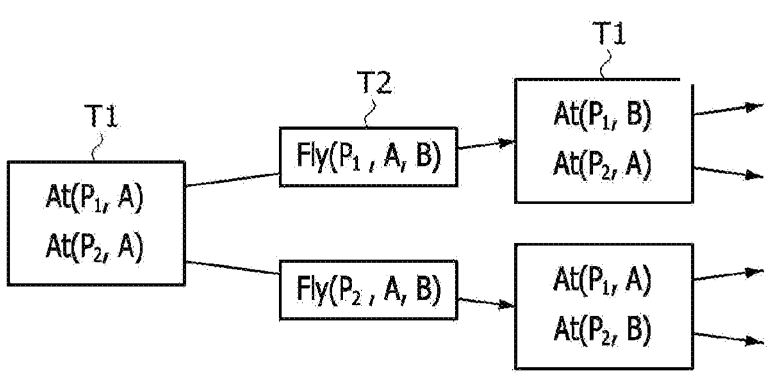
FIG. 5 is a diagram illustrating a method of creating a state space search tree.

FIG. 5 is a diagram illustrating a method of creating a state space search tree. The search tree of FIG. 5 is only a part of the overall search tree and shows an exemplary embodiment of generating a detailed task to constitute a search space at any one point in time (i.e., situation), that is, an exemplary embodiment of expanding a search tree by generating a new search tree branch which is searchable.

Referring to FIG. 5, blocks T1 in the search tree may represent situational knowledge, arrows may represent branches of the search tree, and blocks T2 may represent task knowledge (i.e., individual tasks obtained by inputting detailed values to task knowledge expressed with variables=detailed tasks). Also, the blocks T2 may lead the directions of the arrows. In other words, the branches of the search tree may be led according to task knowledge (or action knowledge) representing unit task information. That is, detailed tasks lead the branches of the search tree.

In other words, a process of determining whether a current node (i.e., a current state) in the search tree satisfies the mission (i.e., determining whether the current node is a target state) and determining whether a subsequent current node of the search tree is the target state when the previous current node is not the target state is repeated. When a current node finally reaches the target state (i.e., a target node), a sequence of actions (i.e., tasks) is generated from a path from an initial state to the target state in the search tree.

More specifically, in a process of building a search tree at each point in time, all possible values (i.e., a corresponding input factor type of knowledge among knowledge, such as $C_1$ and JFK, described in situational knowledge) are simply bound to variables (i.e., input factors of each task) of all task knowledge (or action knowledge), and thus multiple detailed tasks are generated to form a searchable space (i.e., a search space).

As described above, the task planning system 10 is required to rapidly build (expand) a search tree which is applicable to a variety of domains by reducing the amount of calculation (i.e., time and resources). To this end, it is necessary to rapidly perform a method of creating a search tree for an action space and a method of determining expansion nodes to create a search tree, that is, it is necessary to rapidly calculate heuristic evaluation values of front nodes.

Figure 6:
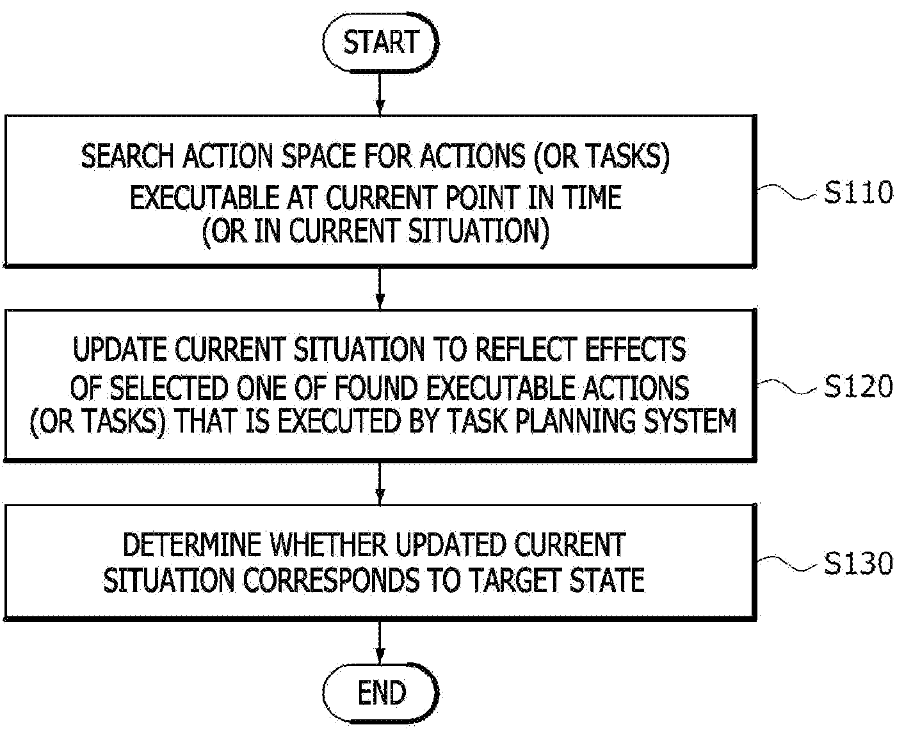
FIG. 6 is a flowchart illustrating a process in which a task planning system creates a search tree for finding a target state according to an exemplary embodiment of the present invention.

FIG. 6 is a flowchart illustrating a process in which a task planning system creates a search tree for finding a target state according to an exemplary embodiment of the present invention.

As shown in FIG. 6, according to an exemplary embodiment of the present invention, the task planning system 10 creates a search tree for finding a target state by automatically processing the following three operations.

The first operation is to search for actions (or tasks) which are executable at a current point in time (or in a current situation) in an action space (S110). The second operation is to update the current situation to reflect effects of a selected one of found executable actions (i.e., tasks) that is executed by the task planning system 10 (S120). The third operation is to determine whether the updated current situation corresponds to the target state (S130).

The task planning system 10 builds (expands) a search tree for finding the target state by repeating the three operations S110 to S130.

Unlike the related art, according to the present invention, the search tree is built (expanded) in the action space.

In the search tree created in the action space (i.e., an action space search tree), nodes represent actions, and edges represent states. This is reversed in a search tree created in a state space (i.e., a state space search tree).

In the state space search tree, a root node is a node corresponding to a state of a point in time when an action plan is started, that is, a node corresponding to a current state, but in the action space search tree, a root node is a virtual action node leading to a state of a current point in time (i.e., an initial state).

In the state space search tree, a target node is a node corresponding to a state when a task is successful (i.e., the target state), but in the action space search tree, the target node is a node corresponding to an action leading to the target state.

Accordingly, there may be several target nodes (i.e., target action nodes) instead of the one in the action space search tree. This is because there may be several actions leading to the target state instead of one.

The foregoing method of expanding an action space search tree is similar to a method of expanding a state space search tree in terms of the concept of expansion. However, expansion of an action space search tree actually differs from expansion of a state space search tree in that nodes represent actions and edges represent states.

In other words, an action space search tree is built by making actions that are executable at a current point in time candidates for a next node (i.e., front nodes) and selecting a front node with the smallest heuristic evaluation value representing the distance (cost) to the target node (i.e., the target action node) for expansion from among the front nodes.

Here, the actions which are executable at the current point in time are actions of which preconditions are satisfied in a situation (state) of the current point in time.

Also, selecting a front node (i.e., a front action node) for expansion means reflecting the postcondition of the corresponding action in the knowledge base of a current situation (state).

According to an exemplary embodiment of the present invention, heuristic evaluation values of front action nodes in an action space search tree are construed as (i.e., considered) a level at which corresponding actions appear in a causal action network.

For reference, a causal relationship between two actions is a directional relationship. When some preconditions of "A" action correspond to some postconditions of "B" action, there is a causal relationship from "B" action to "A" action.

Here, the preconditions and the postconditions may be conjunctions between units of knowledge (i.e., propositions).

Therefore, when some of the preconditions correspond to some of the postconditions, a unit of knowledge (i.e., a proposition) constituting the conjunctions of the preconditions corresponds to a unit of knowledge (i.e., a proposition) constituting the conjunctions of the postconditions.

Each layer is configured by finding such causal relationships from a target action node or other action nodes to all possible detailed actions and connecting the target action node or the other action nodes to all the possible detailed actions. As a result, a tree structure is built which is referred to as a causal action network. In other words, detailed actions connected to detailed actions of one layer constitute the next layer.

Here, detailed actions which appear in the causal action network at least once are excluded from targets, which will belong to a next layer and are searched for a causal relationship, to ensure that there are no identical detailed actions in the causal action network.

Meanwhile, a "target action node" may be defined from the above definitions of a causal relationship and a causal action network.

Since a "target state" is also a conjunction of units of knowledge (i.e., propositions), some postconditions of a detailed action correspond to some preconditions of the target state. Accordingly, a detailed action present in a first-level layer of a causal action network is referred to as a target action node.

For example, when a target state is given by a user as a conjunction of a plurality of units of knowledge (i.e., propositions), an action which has some postconditions corresponding to some preconditions of the target state is found from among all possible detailed actions to constitute a first-level layer.

Here, the detailed action node present in the first-level layer is referred to as a target action node.

Detailed action nodes having causal relationships with the target action node are found from a set of all the possible detailed action nodes excluding the action node of the first-level layer to constitute a second-level layer.

Then, action nodes having causal relationships with the action nodes of the second-level layer are found from a set of all the possible detailed action nodes excluding the detailed action nodes of the first-level layer and the second-level layer to constitute a third-level layer.

This process is repeated until a set of detailed action nodes is empty or no detailed action node having a causal relationship is found.

In the causal action network which is built as described above, a level at which any one detailed action appears is a heuristic evaluation value of the detailed action in the action space search tree.

In other words, in the causal action network, the number of actions to be executed in a process from any one detailed action (i.e., a currently executed action) to the target action (i.e., the distance to the target action node in the action space search tree) is not smaller than the level. Accordingly, the level becomes an admissible heuristic evaluation value.

To ensure finding of the target node, a heuristic evaluation value is required to be permissible. Here, "permissible" means it is ensured that the distance to the target node is never overestimated.

According to the present invention, a hierarchical network (i.e., a causal action network) of detailed actions is built on the basis of causal relationships, and a level at which one detailed action appears in the causal action network becomes the heuristic evaluation value of the corresponding action node in an action space search tree.

An effect of the present invention is that the amount of calculation (i.e., time and memory) is small because a data structure for calculating the heuristic evaluation values of search tree nodes (i.e., a causal action network) is small.

The reason that a causal action network is small is that the causal action network is built on the basis of "detailed actions" rather than possible "detailed states."

In general, parameters of one detailed action include only some variables constituting (or related to) a state of surroundings. Therefore, combinations of all variable values corresponding to the entire state space can be divided into action-specific regions, and the number of "detailed actions" to be considered as a result (i.e., of which heuristic evaluation values are to be calculated) can be reduced.

For example, when three variables A, B, and C have 10 values in an environment, "detailed states" of the environment correspond to combinations of values of the variables A, B, and C, which is 10×10×10=1000 in size. Assuming that there are two executable actions in this environment, "a" action has the variable A as a parameter, and "b" action has the variables B and C as parameters, possible "detailed actions" are 110 in total which is the sum of 10 "a" actions and 100 "b" actions (10 (the number of values of the variable B)×10 (the number of values of the variable C)=100). Accordingly, there are 110 things to be considered in building a causal action network, and the number is about one tenth of 1,000 from the case where "detailed states" are taken into consideration.

Another effect of the present invention is that a causal action network can be built for each target action node when there are a plurality of target action nodes. When a causal action network is built for each individual target action node, that is, one target action node, the depth, that is, the number of layers, of the network tends to increase compared to the case where a network is built by putting multiple target action nodes all together in a first-level layer, and when the depth of the network increases, discrimination between detailed actions can be improved. In other words, it is possible to give differentiated evaluation values to similar actions.

According to an aspect of the present invention, it is possible to automatically generate an action plan by calculating heuristic evaluation values of nodes and branches on the basis of a causal action network.

Although the present invention has been described above with reference to embodiments illustrated in the drawings, the embodiments are merely illustrative, and those skilled in the art should understand that various modifications and other equivalent embodiments can be made from the embodiments. Therefore, the technical scope of the present invention should be determined from the following claims. In addition, descriptions herein may be implemented as, for example, a method or process, a device, a software program, a data stream, or a signal. Even when only discussed in the context of a single form of implementation (e.g., discussed only as a method), discussed features may also be implemented in other forms (e.g., a device or program). A device may be implemented as appropriate hardware, software, firmware, and the like. A method may be implemented in a device, such as a processor or the like, which generally refers to a processing device including a computer, a microprocessor, an integrated circuit, a programmable logic device, or the like. The processor can be a communication device, such as a computer, a cellular phone, a portable/personal digital assistant (PDA), or another device that facilitates communication of information between end users.

What is claimed is:

1. An automated task planning system for generating an action plan and controlling an autonomous thing, comprising:

a processor configured to:

create an action space search tree with action nodes representing executable actions and edges representing resulting states;

calculate heuristic evaluation values for front nodes of the action space search tree using a causal action network, wherein the causal action network is a hierarchical network of detailed actions, each defined by causal relationships where a precondition of one action corresponds to a postcondition of another;

select an expansion node from the front nodes based on a smallest heuristic evaluation value;

generate an action plan of an autonomous thing by traversing the action space search tree to identify a sequence of executable actions achieving a target state; and generate control commands for the autonomous thing based on the generated action plan and automatically control the autonomous thing to execute the sequence of executable actions in a physical environment, wherein execution of the sequence of executable actions changes a physical state of the autonomous thing or an object in the physical environment, and wherein the causal action network reduces computational complexity during execution of the sequence of executable actions by limiting the search space to the detailed actions.

2. The automated task planning system of claim 1, wherein, to create the action space search tree, the processor estimates distances from the front nodes to a target node using a heuristic search and selects a node with a short distance as an expansion node for a next operation, wherein the processor selects an edge that is highly likely to be connected to a node with a small heuristic evaluation value from among edges connected to expandable sub-nodes rather than searching all edges connected to all the front nodes.

3. The automated task planning system of claim 1, wherein, to create the action space search tree, the processor makes a root node an action node that leads to an initial state and makes the target node an action node that leads to a target state.

4. The automated task planning system of claim 1, further comprising a knowledge base system to be used in creating a search tree related to a task or generating an action plan on the basis of the search tree.

5. The automated task planning system of claim 4, wherein the knowledge base system is a system for processing precondition and postcondition data stored in a knowledge base, wherein the knowledge base is a device in which action knowledge including a precondition representing knowledge for determining whether an action is executable in a specific situation and a postcondition representing how the situation changes after the action is executed is stored.

6. The automated task planning system of claim 1, wherein the processor creates the action space search tree on the basis of a plurality of task states and a plurality of task actions for performing a task, wherein the task states are observable positions or forms of an object related to the task during the task, and the task actions are operations performed by subjects of the task to perform the task.

7. The automated task planning system of claim 1, wherein the automated task planning system creates the action space search tree in an action space by repeating operations of:

searching the action space for actions which are executable at a current point in time;

updating a current situation to reflect effects of performing any selected one of found executable actions; and determining whether the updated current situation corresponds to a target state.

8. The automated task planning system of claim 1, wherein, to expand the action space search tree, the processor selects a front action node with a smallest heuristic evaluation value representing a distance or cost for a target node from among front action nodes, wherein the front action nodes are actions which are executable at a current point in time and have preconditions satisfied in a situation of the current point in time, and the selection of the front action node means reflecting a postcondition of the action in a knowledge base of a current situation.

9. The automated task planning system of claim 1, wherein the causal action network is a tree structure of which each layer is built by finding causal relationships between all possible detailed actions beginning with a target action node and connecting the detailed actions having the causal relationships.

10. The automated task planning system of claim 9, wherein each of the causal relationships is a directional relationship between two actions, "A" action and "B" action, when some preconditions of "A" action correspond to some postconditions of "B" action, there is a causal relationship from "B" action to "A" action, the preconditions and the postconditions are conjunctions between units of knowledge, and when some of the preconditions correspond to some of the postconditions, a unit of knowledge constituting the conjunctions of the preconditions corresponds to a unit of knowledge constituting the conjunctions of the postconditions.

11. The automated task planning system of claim 1, wherein, when target states are given by a user as conjunctions between a plurality of units of knowledge, the processor creates the action space search tree by repeating, until a set of all possible detailed action nodes is empty or no detailed action node having a causal relationship is found, operations of:

finding a target action node, which is a detailed action node having some postconditions corresponding to some of the target states, among all the possible detailed action nodes to build a first-level layer;

finding target action nodes, which are detailed action nodes having a causal relationship with the target action node of the first-level layer, among a set of all the possible detailed action nodes excluding the action node of the first-level layer to build a second-level layer, and finding target action nodes, which are detailed action nodes having causal relationships with the target action nodes of the second-level layer, among a set of all the possible detailed action nodes excluding the action nodes of the first-level layer and the second-level layer to build a third-level layer.

12. The automated task planning system of claim 11, wherein the processor ensures that there are no identical detailed actions in the causal action network by excluding detailed actions that are shown in the causal action network at least once from targets which will belong to a next layer and are searched for a causal relationship.

13. The automated task planning system of claim 1, wherein each of the heuristic evaluation values is a level at which one detailed action appears in the causal action network which is a hierarchical network based on causal relationships between detailed actions.

14. An automated task planning method for generating an action plan and controlling an autonomous thing, comprising:

creating, through a processor of a task planning system, an action space search tree with action nodes representing executable actions and edges representing resulting states;

calculating heuristic evaluation values for front nodes of the action space search tree using a causal action network, wherein the causal action network is a hierarchical network of detailed actions, each defined by causal relationships where a precondition of one action corresponds to a postcondition of another;

selecting an expansion node from the front nodes based on a smallest heuristic evaluation value;

generating an action plan of an autonomous thing by traversing the action space search tree to identify a sequence of executable actions achieving a target state; and generating control commands for the autonomous thing based on the generated action plan, and automatically controlling the autonomous thing to execute the sequence of executable actions in a physical environment according to the control commands, wherein execution of the sequence of executable actions changes a physical state of the autonomous thing or an object in the physical environment, and wherein the causal action network reduces computational complexity during execution of the sequence of executable actions by limiting the search space to the detailed actions.

15. The automated task planning method of claim 14, wherein the creating of the action space search tree comprises estimating, by the processor, distances from the front nodes to a target node using a heuristic search and selecting a node with a short distance as an expansion node for a next operation, wherein the processor selects an edge that is highly likely to be connected to a node with a small heuristic evaluation value from among edges connected to expandable sub-nodes rather than searching all edges connected to all the front nodes.

16. The automated task planning method of claim 14, wherein the creating of the action space search tree comprises creating, by the processor, the action space search tree on the basis of a plurality of task states and a plurality of task actions for performing a task, wherein the task states are observable positions or forms of an object related to the task during the task, and the task actions are operations performed by subjects of the task to perform the task.

17. The automated task planning method of claim 14, wherein the creating of the action space search tree comprises creating, by the task planning system, a search tree in an action space by repeating operations of:

searching the action space for actions which are executable at a current point in time;

updating a current situation to reflect effects of performing any selected one of found executable actions; and determining whether the updated current situation corresponds to a target state.

18. The automated task planning method of claim 14, wherein, to expand the action space search tree, the processor selects a front action node with a smallest heuristic evaluation value representing a distance or cost for a target node from among front action nodes, wherein the front action nodes are actions which are executable at a current point in time and have preconditions satisfied in a situation of the current point in time, and the selection of the front action node means reflecting a postcondition of the action in a knowledge base of a current situation.

19. The automated task planning method of claim 14, wherein, when target states are given by a user as conjunctions between a plurality of units of knowledge, the creating of the action space search tree comprises creating, by the processor, the action space search tree by repeating, until a set of all possible detailed action nodes is empty or no detailed action node having a causal relationship is found, operations of:

finding a target action node, which is a detailed action node having some postconditions corresponding to some of the target states, among all the possible detailed action nodes to build a first-level layer;

finding target action nodes which are detailed action nodes having causal relationships with the target action node of the first-level layer among a set of all the possible detailed action nodes excluding the action node of the first-level layer to build a second-level layer; and finding target action nodes which are detailed action nodes having causal relationships with the target action nodes of the second-level layer among a set of all the possible detailed action nodes excluding the action nodes of the first-level layer and the second-level layer to build a third-level layer.

20. An automated task planning method for generating an action plan and controlling an autonomous thing, comprising:

creating, through a processor of the task planning system, an action space search tree with action nodes representing executable actions and edges representing resulting states;

calculating heuristic evaluation values for front nodes of the action space search tree using a causal action network, wherein the causal action network is a hierarchical network of detailed actions, each defined by causal relationships where a precondition of one action corresponds to a postcondition of another;

estimating distances from the front nodes to a target node using a heuristic search to determine the heuristic evaluation values; and selecting a node with a short distance to the target node as an expansion node for a next operation, wherein an edge that is highly likely to be connected to a node with a lower heuristic evaluation value is selected from among edges connected to expandable sub-nodes to update the action space search tree;

generating an action plan of an autonomous thing by traversing the action space search tree to identify a sequence of executable actions achieving a target state; and generating control commands for the autonomous thing based on the generated action plan, and automatically controlling the autonomous thing to execute the sequence of executable actions in a physical environment according to the control commands, wherein execution of the sequence of executable actions changes a physical state of the autonomous thing or an object in the physical environment, and wherein the causal action network reduces computational complexity during execution of the sequence of executable actions by limiting the search space to the detailed actions.

* * * * *